United States Patent [19]

Omietanski et al.

[11] 3,879,433
[45] Apr. 22, 1975

[54] HYDROXYALKYLSILOXANE RIGID URETHANE FOAM STABILIZERS

[75] Inventors: George M. Omietanski; Vincent T. Chuang, both of Marietta, Ohio

[73] Assignee: Union Carbide Corporation, New York, N.Y.

[22] Filed: Dec. 29, 1972

[21] Appl. No.: 319,528

[52] U.S. Cl. .................. 260/448.2 B; 260/2.5 AH; 260/46.5 Y
[51] Int. Cl. .............................................. C07f 7/08
[58] Field of Search .. 260/448.2 B, 448.2 E, 46.5 Y

[56] References Cited
UNITED STATES PATENTS

| | | | |
|---|---|---|---|
| 2,823,218 | 2/1958 | Speier et al. | 260/448.2 E |
| 2,837,550 | 6/1958 | Prober | 260/448.2 B |
| 2,872,434 | 2/1959 | Barnes | 260/448.2 B X |
| 2,970,150 | 1/1961 | Bailey | 260/448.2 E X |
| 3,317,460 | 5/1967 | Clark et al. | 260/448.2 B X |

Primary Examiner—Paul F. Shaver
Attorney, Agent, or Firm—Eugene C. Trautlein

[57] ABSTRACT

This application relates to certain novel hydroxyalkylsiloxanes that are particularly useful as foam stabilizers for rigid polyurethane foams. The novel hydroxyalkylsiloxanes have critical siloxane molecular weights and are produced by an addition reaction involving hydrosiloxanes and olefinically unsaturated alcohols that contain a terminal olefinic double bond which is incapable of shifting.

5 Claims, No Drawings

HYDROXYALKYLSILOXANE RIGID URETHANE FOAM STABILIZERS

Rigid polyether polyurethane foams are produced commercially by introducing several starting materials (i.e., a silicone surfactant, a polyether polyol, a fluorocarbon blowing agent, a catalyst and a polyisocyanate) into a reaction zone. It is important that the relative amounts of the starting materials in the reaction zone be carefully controlled in order to produce a satisfactory polyurethane foam. Control of the relative amount of the starting materials in the reaction zone is achieved, in part, by forming premixtures containing carefully controlled amounts of the silicone surfactant (i.e., a siloxane-polyoxyalkylene block copolymer), polyol, and fluorocarbon. It is desirable that the various components in these premixtures be compatible so as to eliminate the need for stirring the premixtures to insure homogeneity. Certain silicone surfactants are more compatible with the other starting materials in the premixtures than are other silicone surfactants. In particular, those silicone surfactants wherein the polyoxyalkylene blocks are endblocked by hydroxyl groups are generally more compatible in premixtures than are silicone surfactants wherein the polyoxyalkylene blocks are endblocked by alkoxy groups.

Siloxane-polyoxyalkylene block copolymers wherein the polyoxyalkylene blocks are endblocked by hydroxyl groups are often prepared by the addition reaction of a linear polyoxyalkylene polymer endblocked at one end by an allyl group and at the other end by a hydroxyl group (or a group convertible to a hydroxyl group) with a hydrosiloxane. Such polyoxyalkylene reactants can be produced by reacting allyl alcohol with one or more alkylene oxides followed, if desired, by converting the hydroxy group to a group convertible to a hydroxyl group. In the addition reaction, the SiH groups add to the allyl group to produce the block copolymer. When the polyoxyalkylene reactant contains an alcoholic hydroxyl endblocking group, such groups can also react to some extent with SiH groups thereby decreasing the content of the desired hydroxyl groups in the block copolymer product with a resulting decrease in the compatibility of the block copolymer in the abovementioned premixtures. This side reaction also undesirably increases the viscosity of the block copolymer product by partially crosslinking the block copolymer. Further, during the addition reaction, endblocking allyl groups in the polyoxyalkylene reactant tend to isomerize to some extent to propenyl groups which can react with the hydroxyl endblocking groups of the polyoxyalkylene reactant or block copolymer to form acetal groups. These side reactions also reduce the premixture compatability of the block copolymer by decreasing its hydroxyl content and also lead to an undesirable viscosity increase in the block copolymer by partially crosslinking the block copolymer.

When the polyoxyalkylene reactant contains an endblocking group convertible to a hydroxyl group, the undesirable side reactions of the hydroxyl group with the SiH groups and propenyl groups do not occur but the undesirable isomerization of allyl groups can still occur and the block copolymer initially formed must be further processed to regenerate the hydroxyl groups.

It is an object of this invention to provide hydroxyalkylsiloxanes that are useful as foam stabilizers for rigid polyether polyurethane foams.

It is an object of this invention to provide hydroxyalkylsiloxanes that are useful as foam stabilizers for rigid polyether polyurethane foams and that are readily produced from relatively simple alcohol reactants.

It is an object of this invention to provide hydroxyalkylsiloxanes that are useful as foam stabilizers for rigid polyether polyurethane foams and that are produced by a process relatively free of undesirable side reactions.

Other objects of this invention will be apparent from the description thereof appearing below.

This invention provides hydroxyalkylsiloxanes consisting essentially of (A) at least one hydroxyalkylsiloxane unit having the formula:

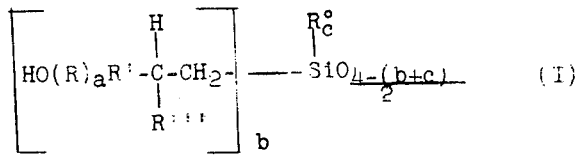

(I)

wherein R is a divalent hydrocarbon group free of aliphatic carbon to carbon multiple bonds, R' is a divalent cyclic hydrocarbon group free of aliphatic carbon to carbon multiple bonds or a divalent—$CR_2''$—group, R'' and R° are each monovalent hydrocarbon groups free of aliphatic carbon to carbon multiple bonds and having from 1 to 10 inclusive carbon atoms, R''' is hydrogen or a monovalent hydrocarbon group free of aliphatic carbon to carbon multiple bonds, each hydroxyalkylsiloxane group has no more than 20 (preferably no more than 10) carbon atoms, $a$ has a value of 0 or 1, $b$ has a value of 1, 2 or 3, $c$ has a value of 0, 1 or 2, and ($b+c$) has a value of 1, 2 or 3; and (B) at least three hydrocarbylsiloxane units represented by the formula:

wherein $R^{\circ\circ}$ is a monovalent hydrocarbon group free of aliphatic carbon to carbon multiple bonds and having from 1 to 10 inclusive carbon atoms and $d$ has a value of 1, 2 or 3, the molecular weight of the siloxane portion of the hydroxyalkylsiloxane being from about 250 to about 1,300 inclusive, and, when dihydrocarbylsiloxane units ($R_2^{\circ\circ}SiO$ units) are present, the ratio of hydroxyalkylsiloxane units to dihydrocarbylsiloxane units is at least 0.5 to 1.0. Those of the hydroxyalkylsiloxanes of this invention containing at least one hydroxyalkylsiloxane unit represented by formula (I) above wherein $b+c$ is 1 or 2 are stable in premixtures containing the siloxane, a polyol and a blowing agent and so such siloxanes are preferred. Preferably, the siloxane portion represents from 60 to 80 weight percent of the hydroxyalkylsiloxane and the hydroxyalkylsiloxane has a viscosity from 17 to 5,000 centistokes at 25°C. As used herein, the "siloxane portion" of the hydroxyalkylsiloxane includes all of the groups and atoms in the hydroxyalkylsiloxane apart from the hydroxyalkyl groups, i.e., apart from the

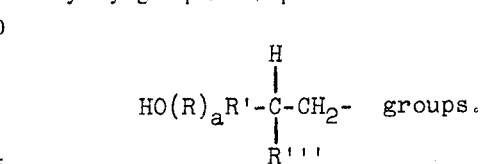

A preferred class of the hydroxyalkylsiloxanes of this invention are represented by the average formula:

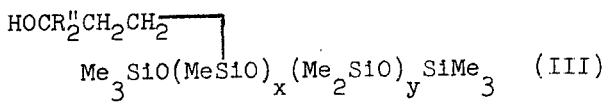

$$\text{Me}_3\text{SiO(MeSiO)}_x(\text{Me}_2\text{SiO})_y\text{SiMe}_3 \quad \text{(III)}$$

wherein R'' is a methyl or ethyl group, Me is a methyl group, x has a value from 1 to 8 inclusive, y has a value from 1 to 6 inclusive, the molecular weight of the hydroxyalkylsiloxane, exclusive of the hydroxyalkyl groups, is from about 300 to about 1,000 inclusive and x:y is at least 0.5:1.

Typical of the monovalent hydrocarbon groups free of aliphatic carbon to carbon multiple bonds represented by R°, R'', R''' and R°° in formulas (I), (II) and (III) above are the alkyl groups (for example the methyl, ethyl, n-propyl, iso-propyl, n-butyl, sec-butyl, isobutyl, t-butyl, n-octyl and decyl, groups), the cycloalky groups (for example, the cyclopropyl, cyclobutyl, cyclopentyl, cyclohexyl, and cycloheptyl groups), the aryl groups (for example, the phenyl and naphthyl groups), the aralkyl groups (for example, the benzyl, 2-phenyl-ethyl, 2-phenylpropyl, cumyl groups) and the alkaryl groups (for example, the tolyl, t-butylphenyl and styryl groups). Typical of the divalent hydrocarbon groups represented by R in formula (I) above are the alkylene and arylene groups (e.g., the methylene, ethylene, propylene, cyclohexylene and phenylene groups). Typical of the cyclic divalent hydrocarbon groups free of aliphatic carbon to carbon multiple bonds represented by R' in formula (I) above are the arylene groups such as the phenylene and tolylene groups and the cycloalkylene groups such as:

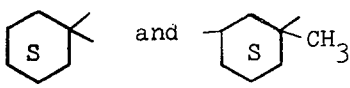

This invention still further provides a process for producing the hydroxyalkylsiloxanes described above which process comprises reacting (1) an olefinic alcohol represented by the formula:

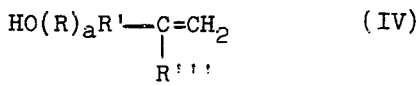

wherein the symbols are as defined for formula (I) with (2) a hydrosiloxane consisting essentially of (A) at least one siloxane unit having the formula:

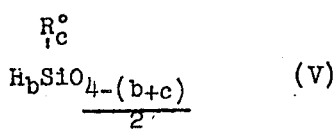

wherein the symbols are as defined for formula (I), and (B) at least three units having formula (II) above, the molecular weight of the hydrosiloxane being from 250 to 1300 inclusive, in the presence of (3) a catalyst for the addition of SiH to olefinic bonds.

Typical of the olefinic alcohols that are useful in producing the hydroxyalkylsiloxanes of this invention are the following:

3-hydroxy-3-methyl-1-butene H$_2$C=CH—CMe$_2$OH
3-hydroxy-3-methyl-1-pentene
  H$_2$C=CHCMe(OH)C$_2$H$_5$
3-hydroxy-3,5-dimethyl-1-hexene
  H$_2$C=CHCMe(OH)CH$_2$CHMe$_2$
6-hydroxy-3,3-dimethyl-1-hexene

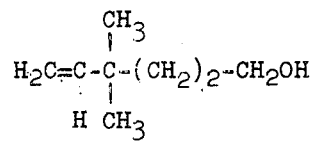

1-hydroxy-1-vinyl cyclohexane 1-vinyl-4-hydroxybenzene

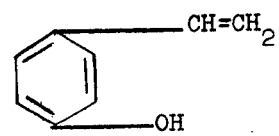

The hydrosiloxane reactants used to produce the hydroxyalkylsiloxanes of this invention can be produced by cohydrolyzing and cocondensing the appropriate hydrolyzable silanes or by equilibrating appropriate siloxanes using conventional techniques.

The process for producing the hydroxyhydroalkylsiloxanes of this invention is conducted in the same manner as used in producing known hydrosiloxane-olefin adducts (i.e., at elevated temperatures and in the presence of a catalyst). Since relatively little side reactions occur, approximately stoichiometric amounts of the olefinic alcohol and the hydrosiloxane (one olefinic group per SiH group) can be employed. Solvents for the alcohol and hydrosiloxane reactants (e.g., liquid hydrocarbons such as toluene) can be employed. Amounts of platinum catalysts that provide from 10 to 200 parts by weight of platinum per million parts by weight of the reactants are useful. Suitable reaction temperatures are from 50° to 100°C. Suitable addition catalysts include chloroplatinic acid and complexes thereof and elemental platinum supported on charcoal or gamma alumina. The process is preferably conducted at a pH from acidic to slightly basic. To this end, the pH of the alcohol reactant can be adjusted to 5 to 6.9 by adding small amount of hydrochloric acid or acetic acid to the alcohol reactant. At the conclusion of the process, any residual (unreacted) SiH can be removed by adding a small amount of methanol and sodium bicarbonate to the product and heating.

In view of the fact that the olefinic double bonds in the olefinic alcohol reactants used in producing the siloxanes of this invention do not isomerize during the reaction with hydrosiloxanes and do not undergo other side reactions significantly, the resulting product contains little undesirable by products. Another advantage of this process is that it involves the use of monomeric alcohol reactants as distinguished from the polyoxyalkylene alcohol reactants employed in prior art processes. Further, the monomeric alcohol reactants employed in the process of this invention need not be reacted to block the hydroxy groups as is done in some prior art processes involving the use of polyoxyalkylene alcohol reactants.

This invention also provides a method for producing rigid polyurethane foams by reacting and foaming a foam formulation (reaction mixture) comprising (a) a polyether containing at least two hydroxyl group and having a hydroxyl number from about 200 to about 1000, (b) an organic polyisocyanate, (c) a catalyst for the reaction of (a) and (b) to produce the polyurethane, (d) a blowing agent and (e) a novel hydroxyalkylsiloxane as described above as a foam stabilizer.

The polyethers that are useful in producing rigid polyurethane foam in accordance with this invention include polyoxyalkylene polyols including alkylene oxide adducts of, for example, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkyl-glucoside, ammonia, triethanolamine, triisopropanolamine, ethylenediamine, diethyylenetriamine, novolac resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like are useful. The alkylene oxides employed in producing polyoxyalkylene polyols normally have from 2 to 4 carbon atoms. Propylene oxide and mixtures of propylene oxide with ethylene oxide are preferred.

The hydroxyl number of the polyether polyols in producing polyurethane foams in accordance with this invention can range from about 200 to about 1000. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = (56.1 \times 1000 \times f/m.w.)$$

where OH = hydroxyl number of the polyol f = average functionality, that is, average number of hydroxyl groups per molecule of polyol m.w. average molecular weight of the polyol.

The organic polyisocyanates that are useful in producing polyurethane foams in accordance with this invention are organic compounds that contain at least two isocyanato groups. Suitable organic polyisocyanates include the poly(aryleneisocyantes) and the hydrocarbon diisocyanates, (.e.g. the alkylene diisocyanates and the arylene diisocyanates).

Illustrative of suitable polyisocyanates are 1,2-diisocyanatoethane, 1,3-diisocyanatopropane, 1,2-diisocyanatopropane, 1,4-diisocyanatobutane, 1,5-diisocyanatopentene, 1,6-diisocyanatohexane, bis(3-isocyanatopropyl)ether, bis(3-isocyanatopropyl)sulfide, 1,7-diisocyanatoheptane, 1,5-diisocyanato-2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-di(isocyanatopropyl)ether of 1,4-butylene glycol, 1,11-diisocyanatoundecane, 1,12-diisocyanatododecane, bis(isocyanatohexyl)sulfide, 1,4-diisocyanatobenzene, 2,4-diisocyanatotoluene, 2,6-diisocyanatotolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene. Suitable poly(aryleneisocyanates) include polymethylene poly(-phenyleneisocyanates) having the formula:

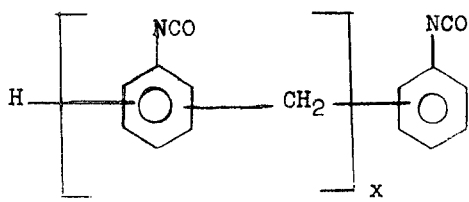

wherein x has an average value from 1.1 to 5 inclusive (preferably from 2.0 to 3.0).

The catalysts that are useful inproducing polyurethane foams in accordance with this invention include amine catalysts and metal catalyst. Useful amine catalysts include tertiary amines such as N,N-dimethyl-2-[2-dimethylaminoethoxy]ethylamine, trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2,2,2]octane (triethylenediamine), hexadecyldimethylamine, and the like. Useful metal catalysts include dibutyl tin dilaurate.

Blowing agents that are useful in producing polyurethane foam in accordance with this invention include water, halogenated hydrocarbons, (e.g., fluorocarbons) such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide and the like.

The relative amounts of the various components used in producing polyurethane foams in accordance with this invention are not narrowly critical. The polyether polyol and the polyisocyanate, taken together, are present in the foam formulations (reaction mixtures) used to produce such foams in a major amount. The relative amounts of these two components is the amount required to produce a polyurethane structure of the foam and such relative amounts are well known in the art. The blowing agent and catalyst are each present in the know amount necessary to achieve the function of the component. Thus, the blowing agent is present in a minor amount sufficient to foam the reaction mixture to the desired density and the catalyst is present in a catalytic amount (i.e., an amount sufficient to catalyze the reaction to produce the polyurethane at a reasonable rate). The siloxane is present in a foam-stabilizing amount (i.e., in an amount sufficient to stabilize the foam). The siloxane is preferably employed in an amount of from 0.2 to 5.0 parts by weight per 100 parts by weight of the polyol, polyisocyanate, catalyst and siloxane.

Conventional additives can be employed in minor amounts in producing polyurethane foams in accordance with the process of this invention if desired for specific purposes. Such additives include inhibitors (such as alpha-methyl styrene and allocimene) and flame retardants (such as ("FYROL-6").

If desired, mixtures of the above-described starting materials (i.e., polyols, polyisocyanates, etc.) can be used in producing polyurethane foams in accordance with this invention.

In accordance with this invention, polyurethane foams are produced by the conventional procedures such as the one-step or one-shot technique wherein all of the reactants are reacted simultaneously with the foaming operation. The foaming and the urethane-forming reaction in the one-step technique occur without the application of external heat. Thereafter, the foam can be heated (postcured) at 150°to 212°F. to eliminate any surface tackiness if desired. Preferred novel siloxanes and premixture containing the novel siloxanes are of low viscosity and do not present particular problems when pumped into mixed headings in the technique conventionally used in the one-shot process. It is often convenient to prepare premixtures containing the hydroxyalkylsiloxane, the blowing agent and the polyol. Such premixtures can also contain the catalysts and/or other additives.

The rigid polyurethane foams produced in accordance with this invention can be used for the same purposes as conventional rigid polyether polyurethane foams (e.g., they can be used as thermal insulating materials in buildings and in refrigerators).

The hydroxyalkylsiloxanes of this invention are also useful as lubricants for textile fibers, emulsifiers and wetting agents.

The hydroxyalkylsiloxanes of this invention may occasionally be of relatively high viscosities (i.e., viscosities of over 5,000 centistokes at 25°C.). However, such viscosities are not the result of partial crosslinking as evidenced by the fact that the viscosities of fairly concentrated solutions of such siloxanes are significantly lower than the bulk viscosities of the siloxanes. Apparently, such high bulk viscosities are due to hydrogen bonding.

In the above formulas, the symbols representing the numbers and types of groups need not have the same meaning at each occurrence throughout the composition. For example, some of the groups represented by formula (II) above can be dimethylsiloxane ($Me_2SiO$) while other of such groups can be triethylsiloxane groups ($[C_2H_5]_3SiO_{0.5}$).

Other hydroxy-organosiloxane rigid polyurethane foam stabilizers are disclosed in U.S. Pat. application No. 319,788, filed Dec. 29, 1972 in the names of G. M. Omietanski, V. T. Chuang and H. D. Furbee, entitled "Hydroxybicyclosiloxane Rigid Urethane Foam Stabilizers" and in U.S. Pat. application Ser. No. 319,786, filed Dec. 29, 1972 in the names of G. M. Omietanski and V. T. Chuang, entitled "Hydroxyalkenylsiloxane Rigid Urethane Foam Stabilizers".

The following Examples illustrate the present invention.

In the following Examples, the abbreviations and symbols used have the indicated meanings:

| | |
|---|---|
| cc | cubic centimeters |
| cstks | viscosity in centistokes at 25°C. |
| Et | ethyl |
| "FYROL-6" | Diethyl-bis(2-hydroxyethyl)amino methylphosphonate |
| g. | grams |
| gal. | gallon |
| I.R. | infra red |
| lbs. | pounds |
| Me | methyl |
| min. | minute |
| ml. | milliliter |
| MW | molecular weight |
| NMR | Nuclear Magnetic Resonance |
| % | percent |
| "PAPI" | A polymeric polyisocyanate having the average formula: |

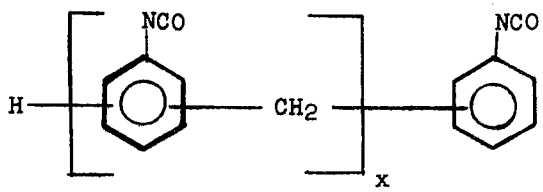

where x has an average value of 1.7

| | |
|---|---|
| Polyol I | A polypropylene oxide triol having a hydroxyl number of 450 produced by reacting sucrose with propylene oxide |
| ppm | parts by weight per million parts by weight |

| | |
|---|---|
| psig | —Continued<br>pounds per square inch gauge pressure |
| sparge | Denotes passing a gas (e.g., nitrogen) through the liquid |
| TMBDA | N,N,N',N'-tetramethyl-1,3-butanediamine. |
| "UCON-11" | trichloromonofluoromethane. |

Hydrosiloxane Preparation

The following procedure is illustrative of a method that can be employed in making the hydrosiloxane reactants useful in producing the hydroxyalkylsiloxanes of this invention. A solution of 0.0218 moles of a hydrosiloxane having the nominal formula $Me_3SiO—(MeHSiO)_{40}SiMe_3$ (55.1g, 354cc/g SiH), 0.909 moles of a mixture of hexamethylcyclotrisiloxane and octamethylcyclotetrasiloxane (63.6g) and 0.193 moles of hexamethyldisiloxane (31.4g, 99.8 percent) were reacted in the presence of 3.0 g sulfuric acid (reagent grade) for 4 hours. This solution was then neutralized with sodium bicarbonate and filtered to give a water white clear equilibrated filtrate with a "nominal" formula of $Me_3—SiO(Me_2SiO)_4—(MeHSiO)_4—SiMe_3$, a viscosity of 4.2 centistokes and a silanic hydrogen content of 129cc/g. The above described reactions were carried out in a 500 ml, three-necked round bottom Morton flask equipped with a stirrer and two glass stoppers. The above "nominal" formula for this hydrosiloxane is the theoretical formula calculated on the basis of complete reaction of the the siloxane starting materials. In this instance, the "nominal" formula is in agreement with the experimentally measured silanic hydrogen content of the hydrosiloxane. In the case of those of the hydrosiloxanes described below where the experimentally measured silanic hydrogen contents did not agree with the "nominal" formulas, the "nominal" formulas were corrected to agree with the silanic hydrogen measurement and the corrected formulas appear below.

Catalyst Solutions

The chloroplatinic acid used in producing the hydroxyalkylsiloxanes described below was employed in the form of a solvent solution. The solution contained 3.3 or 10 parts by weight of chloroplatinic acid hexahydrate and 96.7 or 90 parts by weight of a mixture of solvents. The mixture of solvents consisted of 90 weight percent of the dimethyl ether of ethylene glycol and 10 weight percent of ethanol.

EXAMPLE I

A solution of 0.434 moles of 3-hydroxy-3-methyl-1-butene [$(H_2C=CHC(Me_2)OH$, 38 g., 98.2 percent purity] (this alcohol's pH was adjusted to 5.9 with acetic acid) and a hydrosiloxane having the average formula $Me_3SiO(Me_2SiO)_{1.4}-(MeHSiO)_{2.2}SiMe_3$ (62 g., 125 cc/g. [0.346 equivalents] of SiH) was charged to a 250 ml three-necked flask equipped with a stirrer, thermometer, Dean-Stark trap, sparge tube and a condenser. The contents, under a nitrogen sparge were mixed and heated to 60°C. and catalyzed with 100 ppm Pt as chloroplatinic acid. Further heating to 85°C. resulted in an exotherm which was controlled by cooling. Alternate heating and cooling cycles were then used to maintain the temperature between 84° and 91°C. until the hydrosilylation was completed (as evidenced by the absence of hydrogen in the silicon hydride-alcoholic potassium hydroxide fermentation tube test). The contents were then stripped of volatile materials at 100°C. under a nitrogen sparge to give an adduct represented by the average formula: $Me_3SiO(Me_2SiO)_{1.4}[HOCMe_2(CH_2)_2SiO]_{2.2}SiMe_3$.

EXAMPLE II

Employing the general procedure of Example I, 0.443 moles of 3-hydroxy-3-methyl-1-butene (38.8 g., 98.2 percent purity) adjusted to a pH of 5.9 with acetic acid) was reacted with a hydrosiloxane having an average formula of $Me_3SiO(Me_2SiO)_4(MeSiHO)_4SiMe_3$ (61.3 g., 129 cc/g. [0.342 equivalents] of SiH) in the presence of 100 ppm Pt as chloroplatinic acid catalyst to give an adduct with an average formula: $Me_3SiO(Me_2SiO)_4[HOCMe_2(CH_2)_2SiO]_4SiMe_3$.

EXAMPLE III

Employing the general procedure of Example I, 0.218 moles of 3-hydroxy-3-methyl-1-butene (19.1 g., 98.2 percent purity) (adjusted to a pH of 4.9 with hydrochloric acid) was added to a hydrosiloxane having the average formula $Me_3SiO(Me_2SiO)_4(MeHSiO)_{2.8}SiMe_3$ (43.4 g., 102 cc/g. [0.209 equivalents]SiH) with 50 ppm Pt as chloroplatinic acid catalysts to give an adduct which has the average formula: $Me_3SiO(Me_2SiO)_4[HOCMe_2(CH_2)_2SiO]_{2.8}SiMe_3$.

EXAMPLE IV

Employing the general procedure of Example I, 0.304 moles of 3-hydroxy-3-methyl-1-butene (26.6 g., 98.2 percent purity) (adjusted to a pH of 4.9 with hydrochloric acid) was added to a hydrosiloxane having the average formula $Me_3SiO(Me_2SiO)_{5.2}(MeHSiO)_{7.6}SiMe$ (35.9 g., 173 cc/g. [0.277 equivalents] of SiH) with 50 ppm Pt as chloroplatinic acid as the catalyst to yield an adduct represented by the average formula: $Me_3SiO(Me_2SiO)_{5.2}[HOCMe_2(CH_2)_2SiO]_{7.6}SiMe_3$.

EXAMPLE V

Employing a procedure similar to that previously described in Example I, 0.300 moles of 3-hydroxy-3-methyl-1-butene (26.2 g., 98.5 percent purity) (pH of 7.1) was reacted with a hydrosiloxane having the average formula: $Me_3SiO(Me_2SiO)_{7.8}(MeHSiO)_{11}SiMe_3$ (36.3 g., 175 cc/g., [0.284 equivalents] of SiH, 10.6 cstks) with 0.08 cc of 10 percent chloroplatinic acid solution (50 parts by weight of platinum per million parts by weight of reactants) as the catalyst to yield an adduct represented by the average formula: $Me_3SiO(Me_2SiO)_{7.8}[HOCMe_2(CH_2)_2SiMeO]_{11}SiMe_3$ and a viscosity of 60,083 cstks. A solution containing 70 weight percent of this adduct and 30 weight percent of toluene had a viscosity of 500 centistokes. This viscosity reduction by addition of a solvent indicates that the high bulk viscosity of the adduct is not due to cross-linking but rather is due to hydrogen bonding.

EXAMPLE VI

For purposes of comparison, a procedure similar to that described in Example I, 0.429 moles of 3-hydroxy-3-methyl-1-butene (37.5 g., 98.2 percent purity) (adjusted to a pH of 5.9 with acetic acid) was reacted with a hydrosiloxane which had the average formula $Me_3SiO(Me_2SiO)_{13.2}(MeHSiO)_{5.2}SiMe_3$ (68.3 g., 81 cc/g. [0.247 equivalents] of SiH) in the presence of chloroplatinic acid to give an adduct represented by the average formula: $Me_3SiO(Me_2SiO)_{13.2}[HOCMe_2(CH_2)_2SiO]_{5.2}SiMe_3$.

EXAMPLE VII

For purposes of comparison and employing a procedure similar to that previously described in Example I, 0.154 moles of 3-hydroxy-3-methyl-1-butene (13.4 g., 98.5 percent purity) (pH of 7.1) was added to $Me_3SiOSiMe_2H$ (22.6 g., 91.6 percent purity, 0.140 equivalents of SIH) in the presence of 0.03 cc of a 3.3 percent chloroplatinic acid solution (10 parts by weight of platinum per million parts by weight of reactants). This addition resulted in a product having the average formula $Me_3SiO[SiMe_2(CH_2)_2Me_2COH]$ and a viscosity of 8.4 cstks. I.R. analysis indicated the presence of OH absorption at 3.0 microns, this is consistent with the above structural formula.

EXAMPLE VIII

For purpose of comparison, a procedure similar to that previously described in Example I was followed by adding 0.214 moles of 3-hydroxy-3-methyl-1-butene (18.7 g., 98.2 percent purity) (adjusted to a pH of 5.9 with acetic acid) to $(Me_3Si)_2O(MeHSiO)$ (43.8 g., 98.9 percent purity, 0.195 equivalents of SiH) in the presence of 200 ppm Pt as chloroplatinic acid. This addition resulted in the following product. $(Me_3Si)_2O[HOCMe_2(CH_2)_2SiMeO]$. NMR analysis confirmed the structure of this adduct and indicated that no side reaction of SiH and COH had occurred in that no Si—O—C linkages were detected. Moreover, this adduct and a blend of the reactants used to produce it exhibited the same intensity of I.R. absorption at the wavelength characteristic of the hydroxyl group. The latter observation indicates that little, if any, undesirable side reactions involving the hydroxyl group of the alcohol reactant occurred.

EXAMPLE IX

Following a procedure similar to that outlined in Example I, 0.155 moles of 3-hydroxy-3-methyl-1-pentene (16.1 g., 96.4 percent purity, pH of 3.8) was reacted with a hydrosiloxane having the average formula $Me_3SiO(Me_2SiO)_4(MeHSiO)_{2.8}SiMe_3$ (32.6 g., 102 cc/g. [0.148 equivalents] of SiH, 4.2 cstks.) in the presence of 0.13 cc of a 10 percent chloroplatinic acid solution (110 parts by weight of platinum per million parts by weight of reactants) as the catalyst to give a product which has the average formula: $Me_3SiO(Me_2SiO)_4[HOCMeEt(CH_2)_2SiMeO]_{2.8}SiMe_3$ and a viscosity of 392 cstks. OH absorption at 3.0 microns as determined by I.R. analysis is consistent with the above average formula.

EXAMPLES X to XXII

Following the general procedure described in Example I above, hydroxyalkyl siloxanes having the structures shown in Table I below were prepared by reacting 3-hydroxy-3-methyl-1-butene with the appropriate hydrosiloxanes.

The structure and properties of the hydroxyalkyl siloxanes produced as described in Examples I to XXII are tabulated in Table I below.

TABLE I

HYDROXYALKYLSILOXANE STRUCTURE AND PROPERTIES

| Product From Example | Product Structure (1) | Wt.-% "Siloxane" (2) | "Siloxane" Mol. Wt. (2) | Product viscosity (cstks.) |
|---|---|---|---|---|
| I | $MD_{1.4}D'_{2.2}M$ | 68 | 396 | 2,017 |
| II | $MD_1D'_4M$ | 67 | 694 | 3,801 |
| III | $MD_4D'_{2.8}M$ | 76 | 623 | 687 |
| IV | $MD_{5.2}D'_{7.6}M$ | 60 | 995 | 67,142 |
| V (3) | $MD_{7.8}D'_{11}M$ | 60 | 1,388 | 60,083 |
| VI (3) | $MD_{13.2}D'_{5.2}M$ | 77 | 1,445 | 1,301 |
| VII (3) | MM' | 63 | 147 | 8.4 |
| VIII (3) | MD'M | 72 | 221 | 14.6 |
| IX | $MD_4D''_{2.8}M$ | 69 | 623 | 392 |
| X (3) | $MD_{13}D'_8M$ | 70 | 1,596 | 5,994 |
| XI (3) | $MD_{10}D'_{8.25}M$ | 66 | 1,389 | 5,920 |
| XII (3) | $MD_{10}D'_{13}M$ | 60 | 1,669 | 84,677 |
| XIII | $MD_2D'M$ | 81 | 369 | 18.6 |
| XIV | MDD'M | 77 | 295 | 17.0 |
| XV | $MDD'_2M$ | 67 | 354 | 212 |
| XVI | $MD_{2.2}D'_2M$ | 72 | 446 | 361 |
| XVII | $M'D_{4.25}M'$ | 72 | 446 | 53 |
| XVIII (3) | $MD_{10}D'_{2.8}M$ | 81 | 1,067 | 134 |
| XIX (3) | 'MM' | 44 | 132 | 69.3 |
| XX (3) | $MD_{15.9}D'M$ | 93 | 1,399 | 25.7 |
| XXI (3) | $MD_{14.5}D'_{2.75}M$ | 84 | 1,397 | 76.9 |
| XXII (3) | $MD_{12.27}D'_{5.5}M$ | 73 | 1,394 | 850 |
| (4) | — | 84 | 1,445 | 350 |

Footnotes to Table I (1) M denotes $Me_3SiO_{0.5}$
D denotes $Me_2SiO$
D' denotes $HOCMe_2(CH_2)_2SiMeO$
D'' denotes $HOCMeEt(CH_2)_2SiMeO$
M' denotes $HOCMe_2(CH_2)_2SiMe_2O_{0.5}$ (2) "Siloxane" denotes the portion of the product exclusive of the hydroxyalkyl groups (i.e., the $HOCMe_2(CH_2)_2$— or $HOCMeEt(CH_2)_2$— groups).

(3) Not a hydroxyalkylsiloxane of this invention. Presented only for purposes of comparison.

(4) A commercially available siloxane-polyoxyalkylene block copolymer rigid polyether polyurethane foam stabilizer. Not a hydroxyalkylsiloxane of this invention. Presented only for purposes of comparison.

EXAMPLE XXIII

The siloxanes produced as described in Examples I to XXII above were used in producing polyurethane foams using the formulation and foaming procedure described below.

| Material | Formulation Parts by Weight |
|---|---|
| Polyol I | 70.0 |
| "FYROL-6" | 30.0 |
| "UCON-11" | 50.0 |
| TMBDA | 1.5 |
| Hydroxyalkylsiloxane | 0.2 or 0.4 |
| "PAPI" (Index 105) | 110.0 |

Foaming Procedure

A cleaned and waxed mold was heated to 212°F. and any excess wax was removed with a clean cloth. A premixture was formed containing the "FYROL-6", Polyol I, TMBDA and "UCON 11". The premixture was thoroughly mixed until completely homogeneous and any "UCON 11" that volatilized during mixing was replaced. The mold is cooled to about 120°F. The siloxane is added to the premixture and the premixture is again mixed for 10 seconds. Then the "PAPI" is added to the premixture and the resulting formulation is mixed for 8 seconds. The formulation is introduced into the mold which is then closed. The temperature of the mold is maintained at 115° to 125°F. for 5 minutes. Then the mold is placed into a 212°F. oven for 5 minutes. The cured foam is then removed from the mold. A slice is cut from the center of the foam and the number of cells per linear inch in the middle of the slice is measured. The latter measurement is an index of the fineness of the cell structure. A foam having fewer than 26 cells per inch is regarded as unsatisfactory ("coarse"). The "Rise" or height of the foam is measured. In view of the fact that the formulation used to produce the foam is viscous, a portion thereof sticks to the walls of the container in which the formulation is formed when the bulk of the formulation is introduced into the mold. Accordingly, the foam is weighed and the measured rise is corrected to allow for the amount of formulation retained in the container by using the following formula:

$$\text{Corrected Rise} = \left[10 \times \frac{\text{formulation weight}}{\text{foam weight}} - 10\right] + \left[\text{Measured Rise}\right]$$

Corrected Rise values are reported below. The Rise of a foam is roughly proportional to the potency of the foam stabilizer used to produce the foam.

Premixture Compatibility Test

A mixture is formed containing the following materials:
- 840 grams Polyol I
- 360 grams "FYROL-6"
- 18 grams TMBDA
- 600 grams "UCON-11"

The mixture is stirred at moderate speed with an air motor equipped with a 2 inch propeller. Any "UCON-11" that evaporates during the mixing is replaced by adding more "UCON-11" to the mixture. A 75.8 gram sample of the mixture so formed is added to a jar and then 0.5 cubic centimeters of a hydroxyalkylsiloxane is added to the jar to form a premixture. The premixture is maintained at a temperature below 23°C to minimize loss of "UCON-11" by volatilization. The premixture is stirred with a spatula until well mixed and is then observed visually for clarity or opaqueness.

The results of the above foam preparations are shown in Table II below:

TABLE II

| Product From Example | TEST RESULTS | | | Premixture Compatibility Test |
|---|---|---|---|---|
| | Foam Test | | | |
| | Parts by Weight | Rise (In.) | Cells Per In. | |
| I | 0.4 | 20.9 | 40 | Clear |
| | 0.2 | 15.9 | 36 | |
| II | 0.4 | 19.8 | 44 | Clear |
| | 0.2 | 17.0 | 42 | |
| III | 0.4 | 18.6 | 44 | Clear |
| | 0.2 | 17.8 | 44 | |
| IV | 0.4 | 16.7 | 50 | Clear |
| | 0.2 | 17.0 | 42 | |
| V (a) | 0.4 | 19.6 | 40 | Clear |
| | 0.2 | 18.5 | 38 | |
| VI (a) | 0.4 | 8.4 | Very Coarse | Opaque |
| | 0.2 | 7.9 | Very Coarse | |
| VII (a) | 0.4 | 0.4 | Very Coarse | Clear |
| VIII (a) | No Foam Produced | | | Clear |
| IX | 0.4 | 17.8 | 40 | Clear |
| | 0.2 | 16.9 | 32 | |
| X (a) | 0.4 | 12.0 | Coarse | Opaque |
| XI (a) | 0.4 | 11.2 | Coarse | Clear |
| XII (a) | 0.4 | 14 | 22 (b) | Clear |
| | 0.2 | 9.9 | 12 | |
| XIII | 0.4 | 17.1 | 36 | Clear |
| | 0.2 | 15.6 | 25 | |
| XIV | 0.4 | 15.6 | 30 | Clear |
| | 0.2 | 13.0 | Coarse | |
| XV | 0.4 | 17.5 | 36 | Clear |
| | 0.2 | 13.2 | Coarse | |
| XVI | 0.4 | 17.9 | 40 | Clear |
| | 0.2 | 16.6 | 38 | |
| XVII | 0.4 | 15.3 | 40 | Opaque |
| XVIII (a) | 0.4 | — | — | Opaque |
| | 0.2 | 12.9 | Coarse | |
| XIX (a) | 0.4 | No Foam Produced | | Clear |
| | 0.2 | | | |
| XX (a) | 0.4 | 6.9 | Coarse | Opaque |
| XXI (a) | 0.4 | 7.6 | Very Coarse and Voids | Opaque |
| XXII (a) | 0.4 | 11.6 | Very Coarse | Opaque |
| (c) | 0.2 | 18.0 | 35 | Clear |

Footnotes to Table II
(a) Not a hydroxyalkylsiloxane of this invention. Presented only for purposes of comparison.
(b) Coarse and Voids.
(c) See footnote (4) to Table I above.

The poor foams and/or incompatible (opaque) premixtures obtained using the hydroxyalkylsiloxanes of Examples VI, VII, VIII, X, XI, XII and XVIII to XXII illustrate the importance of the molecular weight limitation that characterizes the hydroxyalkylsiloxanes of this invention. The hydrosiloxanes of Examples VI and X, XI, XII, XX, XXI and XXII had siloxane molecular weights of over 1,300 and the siloxane molecular weights of the hydroxyalkylsiloxanes of Examples VII, VIII and XIX were less than 250. The opaque premixture obtained with the hydroxyalkylsiloxane of this invention of Example XVII supports the preference of having at least one unit represented by formula (I) above wherein $b+c$ has a value of 1 or 2. The poor foams produced with the hydroxyalkylsiloxane of Example XVIII illustrates the importance of the hydroxyalkylsiloxane unit to dihydrocarbylsiloxane unit ratio.

In this Example, the ratio was 0.28:1.0 which is below the minimum ratio of 0.5:1.0 that is characteristic of the siloxanes of this invention. The good foam and compatible premixture produced with the siloxane of Example V shows that some siloxanes outside the scope of this invention may also be satisfactory (although all the others tested were unsatisfactory). The foams produced with the hydroxyalkylsiloxanes of this invention (at least at 0.4 parts by weight concentration) were comparable to the foams produced employing the commercially available siloxane polyoxyalkylene block copolymer.

When hydroxyalkylsiloxanes of this invention containing dihydrocarbylsiloxane units are produced, the hydrosiloxane reactant must have a ratio of hydrosiloxane units to dihydrocarbylsiloxane units of at least 0.5 to 1.

The cyclic divalent hydrocarbon groups represented by R' in formula (I) above include the arylene groups and the cycloalkylene groups. Such cycloalkylene groups have no hydrogen atom bonded to the carbon atom attached to the —HC(R''')—CH$_2$— group.

What is claimed is:

1. A hydroxyalkylsiloxane consisting essentially of (A) at least one hydroxyalkylsiloxane unit having the formula:

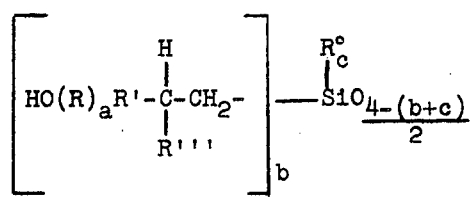

wherein R is a divalent hydrocarbon group free of aliphatic carbon to carbon multiple bonds, R' is an arylene group, a cycloalkylene group that has no hydrogen atom bonded to the carbon atom attached to the —HC(R''')—CH$_2$— group and that is free of aliphatic carbon to carbon multiple bonds or a divalent —CR$_2$''— group, R'' and R° are each monovalent hydrocarbon groups free of aliphatic carbon to carbon multiple bonds and having from 1 to 10 inclusive carbon atoms, R''' is hydrogen or a monovalent hydrocarbon group free of aliphatic carbon to carbon multiple bonds, each hydroxyalkylsiloxane group has no more than 20 carbon atoms, $a$ has a value of 0 or 1, $b$ has a value of 1, 2 or 3, $c$ has a value of 0, 1 or 2, and $(b+c)$ has a value of 1, 2 or 3; and (B) at least three hydrocarbylsiloxane units represented by the formula:

wherein R°° is a monovalent hydrocarbon group free of aliphatic carbon to carbon multiple bonds and having from 1 to 10 inclusive carbon atoms and $d$ has a value of 1, 2 or 3, the molecular weight of the siloxane portion of the hydroxyalkylsiloxane being from about 250 to about 1,300 inclusive, and, when dihydrocarbylsiloxane units (R$_2$°°SiO units) are present, the ratio of hydroxyalkylsiloxane units to dihydrocarbylsiloxane units is at least 0.5 to 1.0.

2. A hydroxyalkylsiloxane as claimed in claim 1 wherein each hydroxyalkylsiloxane group has no more than 10 carbon atoms, the siloxane portion represents from 50 to 80 weight percent of the hydroalkylsiloxane and the hydroalkylsiloxane has a viscosity from 17 to 5,000 centistokes at 25°C.

3. A hydroxyalkylsiloxane as claimed in claim 1 containing at least one hydroxyalkylsiloxane unit as defined in claim 1 wherein $b+c$ is 1.

4. A hydroxyalkylsiloxane as claimed in claim 1 containing at least one hydroxyalkylsiloxane unit as defined in claim 1 wherein $b+c$ is 2.

5. A hydroxyalkylsiloxane as claimed in claim 1 represented by the average formula:

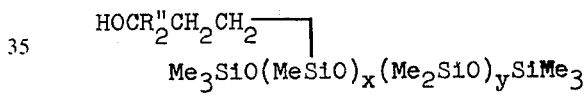

wherein R'' is a methyl or ethyl group, Me is a methyl group, $x$ has a value from 1 to 8 inclusive, $y$ has a value from 1 to 6 inclusive, the molecular weight of the hydroxyalkylsiloxane, exclusive of the hydroxyalky groups, is from about 300 to about 1,000 inclusive and $x:y$ is at least 0.5:1.

* * * * *